Patented Aug. 11, 1942

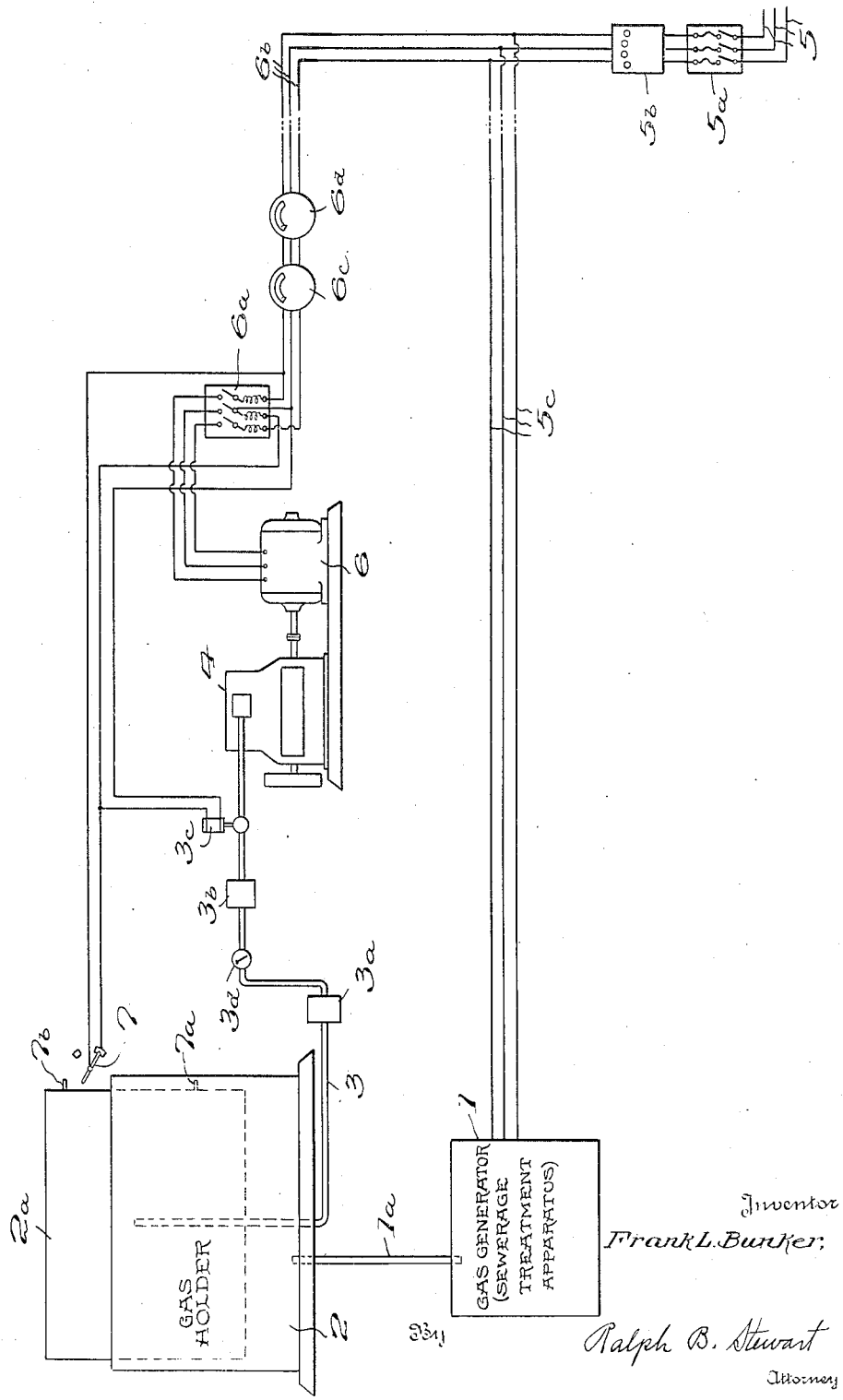

2,292,927

UNITED STATES PATENT OFFICE 2,292,927

ELECTRIC POWER PLANT

Frank L. Bunker, Charlotte, N. C.

Application January 28, 1942, Serial No. 428,591

6 Claims. (Cl. 290—4)

This invention relates to electric power plants, and in particular to an auxiliary power plant for operation in connection with a main power system.

My invention is especially concerned with auxiliary generating plants which utilize a by-product fuel produced in a manufacturing operation requiring a certain amount of electric current which is normally taken from a main power system. The auxiliary generating plant may serve to supply part or all of the electric load required by the manufacturing process, or it may even on occasions feed energy back into the main power system. My invention is especially suitable for use in sewage disposal plants where the by-product gas may be used as a fuel for an internal combustion engine which in turn drives an electric generator. It will be obvious, however, that the invention is not limited in its application to use in a sewage disposal plant, but it may be installed in connection with any manufacturing process which produces a by-product gas suitable for use as fuel for an internal combustion engine.

An object of the invention is to devise a completely automatic auxiliary generating plant for utilizing a by-product fuel to generate electric current for use in the manufacturing process or for feeding energy back to the main power system.

Another object is to devise an auxiliary generating system that will have maximum utilization of the sewer gas as it is generated or collected. I provide an accumulator for storing the fuel, and when a predetermined quantity has been stored, suitable control means responsive to the amount of fuel in storage operates to start the engine and to maintain the engine in operation at its maximum efficiency until the fuel has been depleted to a certain point.

An object of my invention is to devise a power system for utilizing sewage digestor gas in the generation of electric power where insufficient gas is available to furnish all power requirements and where it is necessary to draw from another source of electrical power.

A further object is to devise a power system which will be fully automatic in operation, the operation being controlled in accordance with the generation and accumulation of sewage digestor gas.

Still another object is to devise an auxiliary generating plant which does not require devices to synchronize its operation with the main power system. For this purpose I employ an induction generator for starting the internal combustion engine by operation as an induction motor on power supplied from the main power system, and, after the engine has started, the generator will be driven in excess of synchronous speed to supply power to the system.

Another object is to devise an auxiliary plant that will be simple in operation and require a minimum amount of supervision.

A preferred embodiment of my invention is diagrammatically illustrated in the accompanying drawing.

Referring to the drawing, 1 indicates manufacturing apparatus for carrying out any manufacturing process which produces a by-product gas suitable for use as fuel for an internal combustion engine. The bi-product fuel is conducted through a connection 1a to a suitable gas holder 2 for storage of the gas. The holder 2 is of the constant pressure, variable capacity type and involves a movable bell 2a. Fuel gas from holder 2 is supplied through connection 3 to an internal combustion engine 4. A moisture trap 3a and a flame trap 3b may be included in the connection 3 to prevent transmission of moisture to the engine and to prevent flame from entering the gas holder from the engine. A normally closed electrically operated valve 3c is included in the connection 3 to control the flow of gas in this connection. A check-valve 3d is included in the connection 3 between the holder 2 and the flame trap 3b to prevent back flow of gas in this connection.

Energy for operating the motors and other devices embodied in the apparatus 1 is supplied from a main electric system 5 through a main switch 5a, a main watt-hour meter 5b and through connections 5c. An induction generator 6 is coupled to be driven by the engine 4, and is connected by means of an electrically operated switch 6a through connections 6b to the main power system 5 as shown. A watt meter 6c and an ammeter 6d may be included in the connection 6b. A single pole, single throw switch 7 is mounted on the gas holder 2 and is arranged to be operated by a pair of operating fingers 7a and 7b carried by the movable bell 2a of the holder. Switch 7 controls the energizing circuits for magnet valve 3c and magnet switch 6a. The arrangement is such that finger 7a closes switch 7 when the bell 2a reaches a predetermined elevation, and finger 7b opens switch 7 when the gas within the holder has been depleted to a predetermined point. The circuits for valve 3c and switch 6a may be energized from the main power system as shown, or from a separate source of power, as desired.

In the preferred embodiment of my invention, the apparatus 1 would be a sewage disposal or treatment plant which liberates digestor gas at a variable rate, depending upon a number of conditions. The rate of generation of the gas will be dependent upon the temperature within the digestor tank and also on the amount of organic solids which are pumped into the tank, as well as on other conditions. In addition to the variable rate of generation, in relatively small plants the average rate of generation will be less than the rate at which the gas would be consumed by the engine 4, and the holder 2 is provided to store the gas and to supply the gas to the engine 4 at periodic intervals.

As the gas accumulates in the holder 2, the bell 2a rises, and when the bell has risen to a certain point, the finger 7a operates the switch 7 to energize valve 3c and switch 6a. Operation of valve 3c opens the connection 3 and admits gas to the engine 4. Operation of switch 6a closes connection 6b and completes a circuit for operating induction generator 6 as an induction motor from the main power supply 5. Generator 6, now acting as a motor, drives engine 4 to start the engine. As soon as the engine picks up, the engine assumes a speed to drive generator 6 above synchronous speed as determined by the frequency of the supply 5. Under this condition, generator 6 will supply energy back to the main power system 5 through meters 6c, 6d and 5b. It will be understood that the throttle and governor of the engine 4 are set so that the engine tends to operate at a speed in excess of synchronous speed of generator 6. It is not necessary to employ a speed governor on the engine, but if a governor is used, it would be set so that it does not become effective until the engine has reached a speed in excess of the synchronous speed of the generator 6. I prefer not to use a governor, and the throttle of the engine is set to limit the amount of fuel supplied to the engine. Since the load delivered by the generator 6 will increase with increasing speed, the generator will serve to limit the speed of the engine.

In a small installation, the engine 4 will consume the gas from the holder 2 at a faster rate than the rate of accumulation from apparatus 1, and the bell 2a will be lowered while the engine is running. When the bell reaches a predetermined point, finger 7b will operate switch 7 to open position, thereby permitting valve 3c to close and opening switch 6a, thus stopping the engine and disconnecting generator 6 from the main power system. The engine will remain stopped until the next operation of the switch 7 by the finger 7a.

From the foregoing it is clear that engine 4 will operate at periodic intervals depending upon the rate of accumulation of the gas in the holder 2. By utilizing the gas holder and operating the engine only at intervals, the engine may be operated at maximum efficiency, and no gas is wasted. The power generated by generator 6 is fed back to the main power system 5 and reduces the amount of power demand on the system by the apparatus 1. In case of large sewage plants, it may be possible for the generator 6 to supply more than the power required by the plant, and in this case the generator would supply a certain amount of power back to the system 5. The net power taken by the disposal plant from the main system is registered by the watt-hour meter 5b. In addition to motors for operating the pumps in the sewage disposal plant, electric energy is also required for operation of other devices such as water heaters, incubators, lights, etc. My auxiliary generating plant makes it possible to utilize the by-product gas to materially reduce the amount of electric energy which must be purchased from the main power system.

Attempts have been made to develop auxiliary power plants for operation in connection with a main power system, using a synchronous generator at the auxiliary plant. Such systems are objectionable because of the fact that they require special devices for synchronizing the operation of the auxiliary generator with the main power system and for insuring proper operation while connected to the main system. The special devices frequently get out of order and cause disturbances on the main system, and for this reason the owners of large power systems will not permit privately owned auxiliary plants to be operated in parallel with their systems. The auxiliary plant which I have developed does not require special synchronizing or control devices, and the operation of the auxiliary plant does not create any disturbance on the main system.

Should proper operation of the induction generator require correction of the power-factor of the line operating the disposal plant, it will be obvious to those skilled in the art that static condensers may be connected to the line to improve the power-factor. Such condensers may be connected directly across the line conductors or may be connected to the line conductors through step-up transformers.

While I have described and illustrated a preferred embodiment of my invention, it will be obvious to those skilled in the art that details of the system may be varied without departing from the principle of the invention.

What I claim is:

1. An electric power system comprising, in combination, a main power circuit for supplying alternating current at a predetermined frequency, power consuming apparatus connected to said main power circuit, said apparatus producing a by-product suitable for use as fuel in an internal combustion engine, storage means for receiving said by-product fuel, an auxiliary source of power comprising an induction generator, an internal combustion engine for driving said generator, a connection for supplying fuel to said engine from said storage means, and means responsive to the accumulation of a predetermined quantity of said by-product fuel in said storage means for connecting said generator to said main power circuit to operate the same as an induction motor and thereby rotate and start said engine, whereby said engine becomes a source of power for driving said generator above its synchronous speed and thereby supplying power to said main power circuit.

2. An electric power system comprising, in combination, a main power circuit for supplying alternating current at a predetermined frequency, power consuming apparatus connected to said main power circuit, said apparatus producing a by-product suitable for use as fuel in an internal combustion engine, storage means for receiving said by-product fuel, a meter for metering the power supplied to said apparatus from said power circuit, an auxiliary source of power comprising an induction generator, an internal combustion engine for driving said generator, a connection for supplying fuel to said engine from said storage means, and means responsive to the accumulation of a predetermined quantity of said by-product fuel in said storage means for connecting said generator to said main power circuit through said meter to operate said generator as an induction motor and thereby rotate and start said engine, whereby said engine becomes a source of power for driving said generator above its synchronous speed and thereby supplying power to said main power circuit through said meter, and said meter registers the net power supplied to said apparatus from said main power circuit.

3. An electric power system comprising, in combination, a main power circuit for supplying alternating current at a predetermined frequency, power consuming apparatus connected to said main power circuit, said apparatus producing a gas suitable for use as fuel in an internal combustion engine, a meter for metering the power supplied to said apparatus from said power circuit, an auxiliary source of power comprising an induction generator, an internal combustion engine for driving said generator, a connection for supplying gas to said engine from said apparatus, and means for connecting said generator to said main power circuit through said meter, said engine serving to operate said generator above its synchronous speed and thereby supplying power to said main power circuit through said meter.

4. An electric power system comprising, in combination, a main power circuit for supplying alternating current at a predetermined frequency, power consuming apparatus connected to said main power circuit, said apparatus producing a by-product suitable for use as fuel in an internal combustion engine, storage means for receiving said by-product fuel, an auxiliary source of power comprising an induction generator, an internal combustion engine for driving said generator, means responsive to the accumulation of a predetermined quantity of said by-product fuel in said storage means for connecting said generator to said main power circuit to operate the same as an induction motor and thereby rotate said engine, means controlled simultaneously with the rotation of said engine for supplying fuel to said engine from said storage means, whereby said engine becomes a source of power for driving said generator above its synchronous speed and thereby supplying at least a part of the power consumed by said apparatus, and means responsive to depletion of said fuel to a predetermined point in said storage means for cutting off the supply of fuel to said engine and disconnecting said generator from said main power circuit.

5. In combination, sewage treatment apparatus which produces digester gas suitable for use as a fuel for an internal combustion engine, a variable capacity holder for storing said gas, a main power circuit for supplying alternating current at a predetermined frequency to operate said apparatus, an auxiliary source of electric power comprising an induction generator, an internal combustion engine for driving said generator, a connection from said gas holder for supplying gas to said engine, a normally closed electromagnetic valve included in said connection, a normally open electromagnetic switch for connecting said generator to said main power circuit, means including a control switch operated by a movable part of said gas holder when a predetermined quantity of gas has been stored therein for energizing said valve and said electromagnetic switch to supply gas to said engine and to connect said generator to said main power circuit, whereby said generator operates as an induction motor to rotate and start said engine, said engine, after starting, serving to drive said generator above its synchronous speed and thereby supplying power to said apparatus and to said main power circuit, and means operated by said movable part of said gas holder for opening said control switch when the gas in said holder has been depleted to a predetermined point.

6. An electric power system comprising, in combination, a main power circuit for supplying alternating current at a predetermined frequency, power consuming apparatus connected to said main power circuit, said apparatus producing a combustible gas suitable for use as fuel in an internal combustion engine, a storage holder for receiving said gas and having a part which moves in accordance with the amount of gas stored therein, an internal combustion engine, a connection from said gas holder for supplying gas to said engine, a normally closed electromagnetic valve included in said connection, an auxiliary source of electric power comprising an induction generator coupled to be driven by said engine, a normally open electromagnetic switch for connecting said generator to said main power circuit, means including a control switch operated by said movable part of said gas holder when a predetermined quantity of gas has been stored therein for energizing said valve to supply gas to said engine and for energizing said electromagnetic switch to connect said generator to said main power circuit, whereby said generator operates as an induction motor to rotate and start said engine, said engine, after starting, operating to consume said gas at a greater rate than the gas is stored in said holder and serving to drive said generator above its synchronous speed and thereby supplying power to said apparatus and to said main power circuit, and means operated by said movable part of said gas holder for opening said control switch when the gas in said holder has been depleted to a predetermined point.

FRANK L. BUNKER.